May 24, 1966  J. E. EYNON  3,252,593
MODIFIED PULPWOOD LOAD ALIGNER
Filed June 24, 1963  5 Sheets-Sheet 1

Inventor
John Ernest Eynon
By Stevens, Davis, Miller + Mosher
Attorneys

May 24, 1966  J. E. EYNON  3,252,593

MODIFIED PULPWOOD LOAD ALIGNER

Filed June 24, 1963  5 Sheets-Sheet 2

Inventor
John Ernest Eynon
By Stevens, Davis, Miller & Mosher
Attorneys

May 24, 1966  J. E. EYNON  3,252,593
MODIFIED PULPWOOD LOAD ALIGNER
Filed June 24, 1963  5 Sheets-Sheet 4

Inventor
John Ernest Eynon
By Stevens, Davis, Miller & Mosher
Attorneys

May 24, 1966 J. E. EYNON 3,252,593
MODIFIED PULPWOOD LOAD ALIGNER
Filed June 24, 1963 5 Sheets-Sheet 5

Inventor
John Ernest Eynon
By Stevens, Davis, Miller & Mosher
Attorneys 3,252,593
MODIFIED PULPWOOD LOAD ALIGNER
John E. Eynon, Fort William, Ontario, Canada, assignor to Abitibi Power & Paper Company, Limited, Iroquois Falls, Ontario, Canada, a company of Canada
Filed June 24, 1963, Ser. No. 239,991
Claims priority, application Canada, Mar. 22, 1963, 871,486
6 Claims. (Cl. 214—6)

This invention relates to an improved load aligner and more particularly to an apparatus adapted for aligning logs which have been loaded cross-wise upon a vehicle which is used to transport them.

In the logging industry when logs are cross-loaded on a transporting vehicle such as a truck or a trailer, a condition invariably exists where the log ends are not even and protrude excessively beyond the load width. It has become essential for transporting of this material over public highways that some economical means be found to align these loads to the legal allowable load widths.

The apparatus now presently being used for aligning logs is rather complex as regards to the superstructure used to support the aligning means.

The object of the present invention is to provide an improved compact apparatus for aligning logs lying across vehicles, which is less costly, relatively simple and lighter in construction and easily portable compared to the devices now on the market. It is desired that this apparatus be mobile in that it can be easily dismantled, packed on a truck and moved to a new location and be set up again. The advantage of using an apparatus, according to the present invention, is that it can always be moved near the source where the logs are loaded on the transporting vehicle.

Another object of this invention is to provide an apparatus which utilizes the motor power of the transporting vehicle and requires no further operator than the driver of the transporting vehicle.

A further object of this invention is to provide a load aligner which will operate rapidly and very efficiently and yet will handle a load of any length.

The foregoing objects are achieved in accordance with this invention by providing an apparatus for aligning a load of logs lying across a vehicle comprising a supporting framework, a pair of drums being rotatably mounted on said framework with at least one of said drums being also pivotally mounted, said drums being spaced to permit said vehicle with its load to be driven between said drums with said drums bearing on the ends of said logs.

The invention is illustrated, by way of example, in the accompanying drawings in which.

Figure 1:
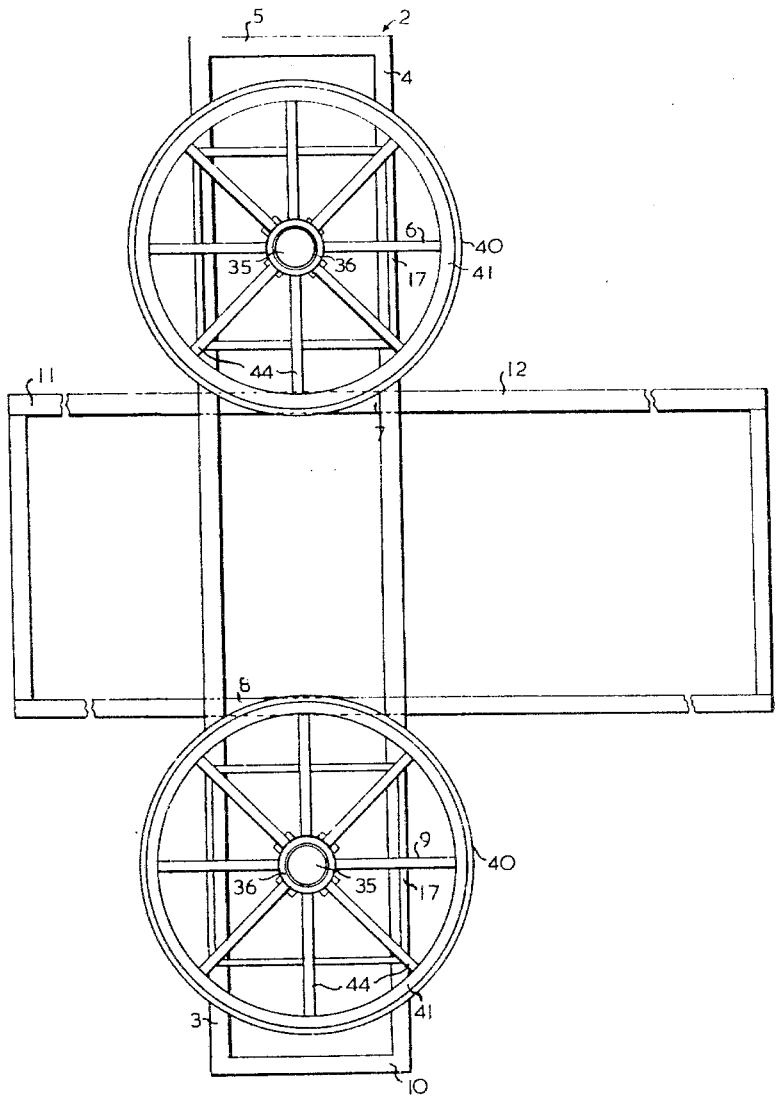
FIGURE 1 is a plan view showing the basic structural outline of the load aligner.

Referring now to the drawings and in particular FIGURE 1, main frame 2 containing the load aligner is composed of two longitudinal frame members 3 and 4, which are joined together by traverse frame members 5, 6, 7, 8, 9 and 10. On the outside of longitudinal member 3 is constructed a ramp 11 on which the transporting vehicle containing the logs may enter or leave the aligning device. Also on the outside of longitudinal member 4 another ramp 12 is constructed by which the transporting vehicle may leave or enter the aligning device. The two ramps 11 and 12 and the area encompassed by members 3, 7, 4 and 8 of the main structure are covered with any suitable planking 13 shown in FIGURE 3.

Adequate stability for the aligning device is provided by virtue of the fact that ramps 11 and 12 are attached to members 3 and 4 in such a way that the load weight of the transporting vehicle on the ramp tends to resist any over-turning moment of the aligning unit.

Figure 2:
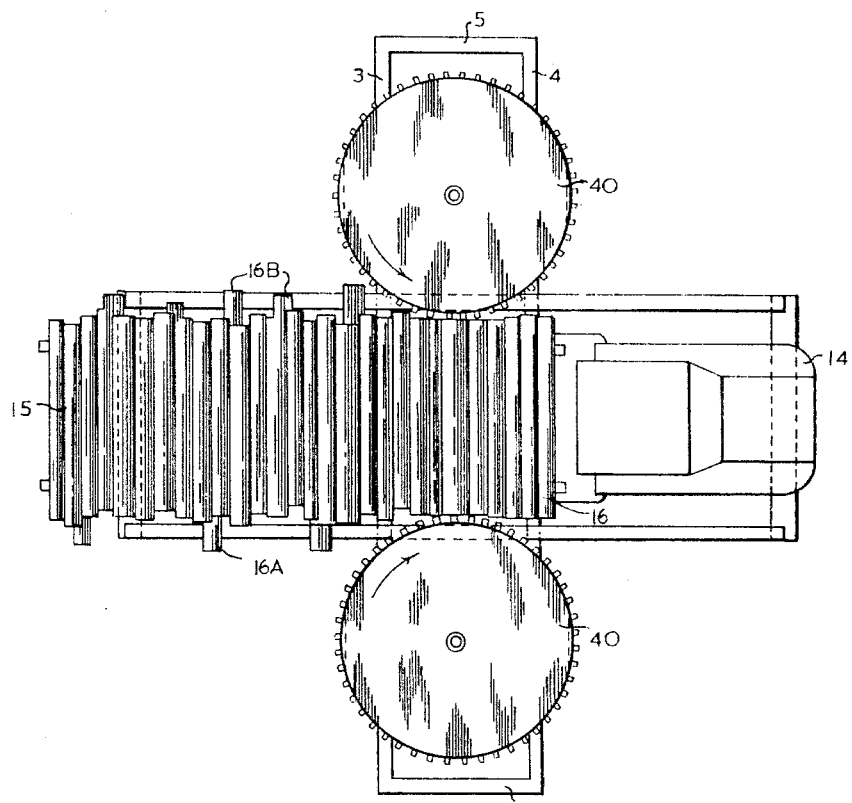
FIGURE 2 is a plan view of the apparatus in accordance with the present invention showing a vehicle containing logs to be aligned passing through the apparatus.

Referring now to FIGURE 2 a transporting vehicle 14, which is shown here as a truck, has loaded on it a load 15 of pulpwood bolts 16 which have been loaded cross-wise. Some of the pulpwood bolts, such as pulpwood bolt 16A, are shown as extending beyond one side of the vehicle 15 and other pulpwood bolts such as 16B are shown as extending beyond the other side of the vehicle 14.

Figure 3:
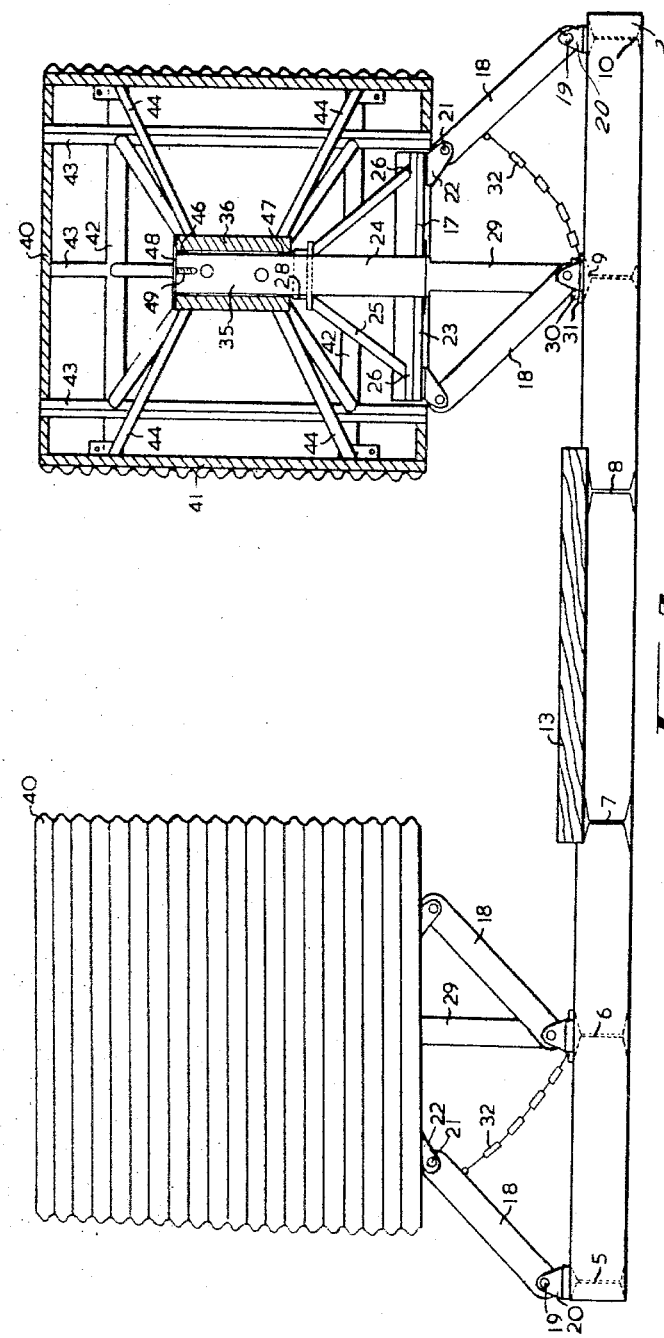
FIGURE 3 is an end elevational view corresponding with FIGURE 1 and showing a longitudinal section through one of the drums.

The aligning device is shown in detail in FIGURE 3 in which a pair of drums 40 are suitably spaced to allow a vehicle loaded with pulpwood bolts to pass between them. Drum 40 contains a drum supporting means 17. The drum supporting means 17 is pivotally connected to the longitudinal frame members 3 and 4 by a pair of hinge frames 18. Hinge frames 18 are connected at the bottom by means of pins 19 to lugs 20 which are integrally connected to longitudinal frame members 3 and 4. Hinge frames 18 are connected at the top by means of pins 21 to lugs 22 which are integrally connected to the drum supporting means 17. Drum supporting means 17 comprises a rectangular base member 23 through which a non-rotatable shaft 24 is integrally mounted. Shaft 24 is additionally supported by struts 25 which are integrally attached to shaft 24 at the point where hub thrust bearing 28 is located and then extends downwardly and outwardly to the corners 26 of the base member 23.

The lower extremity of shaft 24 below the base member 23 forms a supporting column 29 which terminates in a foot member 30 which rests on a rubber pad 31. The rubber pad 31 is integrally connected to the traverse member 9. By this construction foot member 30 rests freely on resilient pad 31 which is preferably rubber and, therefore, is free to move upwards and outwards when drum 40 is displaced. It is preferred that the adjustment of the hinge frames 18 and the length of the supporting column 29 is such that the hinge frames form an angle of approximately 45° with the longitudinal members 3 and 4.

Chains 32 are provided as a safety feature to restrict the range of drum movement within the desired limit.

The upper extremity of shaft 24 above hub thrust bearing 28 provides the axle or spindle 35 upon which the drum hub 36 is rotatably mounted. Sleeve bearings 46 and 47 are provided between axle 35 and drum hub 36.

Drum 40 comprises a circular shell 41 suitably reinforced by circular channel members 42 and vertical channel members 43. The vertical channel members 43 are joined to the drum hub 36 by means of radial spokes 44.

It is preferred that the shell 41 of drum 40 carry corrugations which may be either horizontal or vertical.

A cap 48 with a locking screw 49 is provided on the top of hub 36 to retain the drum 40 on axle 35 when the drum 40 is displaced.

To align the ends of the pulpwood bolt 16 piled on a vehicle 14, such as a truck, the driver drives the truck onto the ramp 11 and between the drums 40.

When the pulpwood bolts pass between the drums 40, the drums 40 are caused to rotate which provide a rolling action. This rolling action straightens the logs as the truck passes between the drums 40. In most cases, a single pass may be sufficient to align the load 16 but in some cases it may be necessary to make several passes or reverse for a short distance and then go forward to completely align the load.

It is noted that there is no limit on the length of the load which may be handled and no mechanical power is required for the operation. Furthermore, the only operator needed is the driver of the truck.

As previously stated when the load 15 passes between the drums 40, the protruding logs are pushed in by the rolling action of the drums. When overlength logs, or logs which cannot be pushed into alignment because of fouling are encountered, one or both drums are displaced outwardly. If a drum is displaced horizontally, it is also raised vertically by virtue of the inclined hinge frames 18 thereby storing kinetic energy for return of the drum to its original position once the obstruction is passed. In as much as the angle of the hinge frames 18 is preferably about 45° to the horizontal, a drum will have a reaction to an outward displacement force about equal to its weight.

Figure 5:
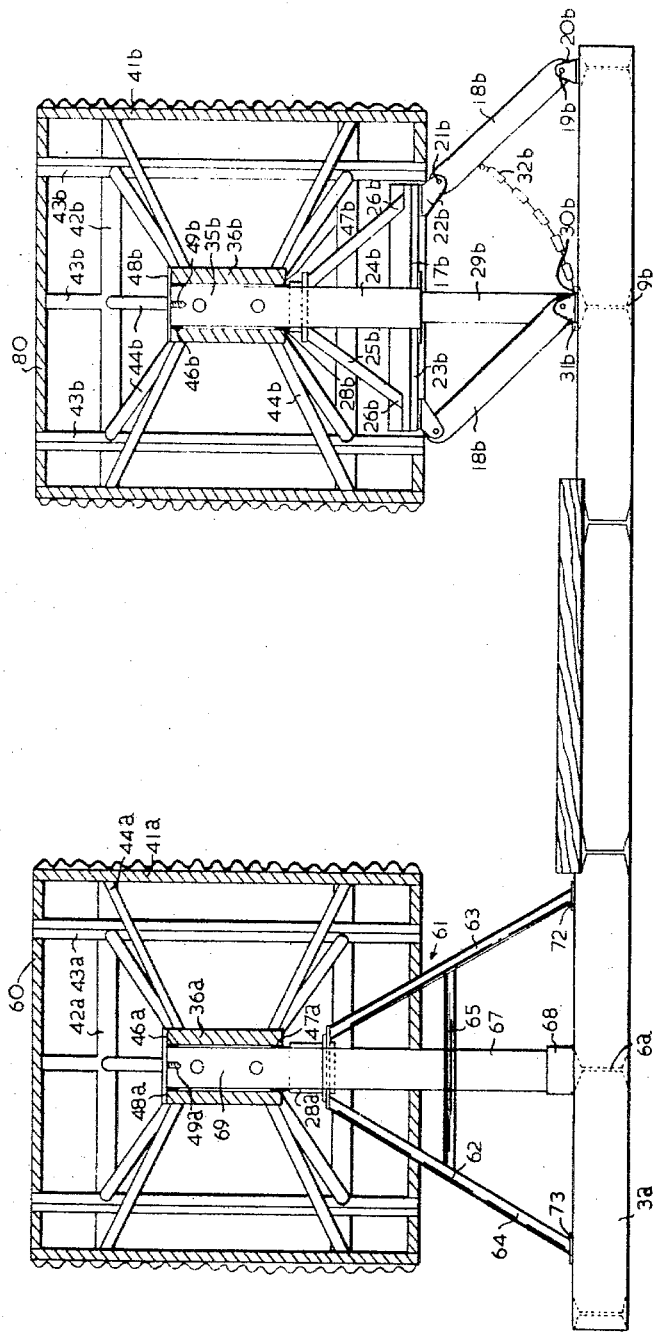
FIGURE 5 is a part sectional end elevational view showing an alternative embodiment of this invention.

In the alternative embodiment shown in FIGURE 5, drum 60 is stationary in that it cannot be displaced outwardly. However drum 80 is constructed in the same manner as drum 40 in FIGURE 3 and, therefore, drum 80 is capable of being displaced if the load contains obstructions.

Stationary drum 60 is mounted on a pedestal 61. Pedestal 61 comprises a pyramid shaped frame 62 composed of side members 63 and 64 supported by a brace member 65 and a column 67 integrally secured in the top of the pyramid shaped frame 62. Side members 63 and 64 are integrally attached to longitudinal frame member 3a at 72 and 73 respectively. The bottom of column 67 is integrally secured to traverse member 6a by the metal plates 68. The top of the column 67 above the pyramid shaped frame 62 forms an axle 69 on which the hub 36a of drum 60 is rotatably mounted. Sleeve bearings 46a and 47a are provided between axle 69 and drum hub 36a. A hub thrust bearing 28a is placed between said hub 36a and the top of pedestal 61.

Drum 60 comprises a circular shell 41a suitably reinforced by circular channel members 42a and vertical channel members 43a. The vertical channel members 43a are joined to the drum hub 36a by means of radial spokes 44a.

It is preferred that the shell 41a of drum 60 carry corrugations which may be either vertical or horizontal.

A cap 48a with a locking screw 49a is provided on the top of hub 36a to retain the drum 60 on axle 69.

Drum 80 is secured to supporting means 17b which is shown as being pivotally connected to longitudinal frame member 3a by a pair of hinge frames 18b. Hinge frame 18b is connected at its bottom by means of a pin 19b to lug 20b which is integrally connected to longitudinal frame member 3a. Hinge frame 18b is connected at its top by means of a pin 21b to lug 22b which is integrally connected to drum supporting means 17b. Drum supporting means 17b comprises a rectangular base member 23b through which a non-rotatable shaft 24b is integrally mounted. Shaft 24b is additionally supported by struts 25b which are integrally attached to shaft 24b at the point where hub thrust bearing 28b is located and then extend downwardly and outwardly to the corners 26b of the base member 23b.

The lower extremity of shaft 24b below the base member 23b forms a supporting column 29b which terminates in a foot member 30b which rests on a resilient pad 31b which is preferably rubber. The pad 31b is integrally connected to the traverse member 9b. By this construction foot member 30b rests freely on rubber pad 31b and, therefore, is free to move upwards and outwardly when drum 80 is displaced. It is preferred that the adjustment of the hinge frames 18b and the length of the supporting column 29b is such that the hinge frames 18b form an angle of approximately 45° with the longitudinal members to which they are attached.

Chain 32b is provided as a safety feature to restrict the range of drum movement within the desired limit.

The upper extremity of shaft 24b above hub thrust bearing 28b provides the axle or spindle 35b upon which the drum hub 36b is rotatably mounted. Sleeve bearings 46b and 47b are provided between axle 35b and drum hub 36b. Drum 80 comprises a circular shell 41b suitably reinforced by circular channel members 42b and vertical channel members 43b. The vertical channel members 43b are joined to the drum hub 36b by means of radial spokes 44b.

It is preferred that the shell 41b of drum 80 carry corrugations which may be either horizontal or vertical.

A cap 48b with a locking screw 49b is provided on the top of hub 36b to retain the drum 80 on axle 35b when the drum 80 is displaced.

Figure 4:
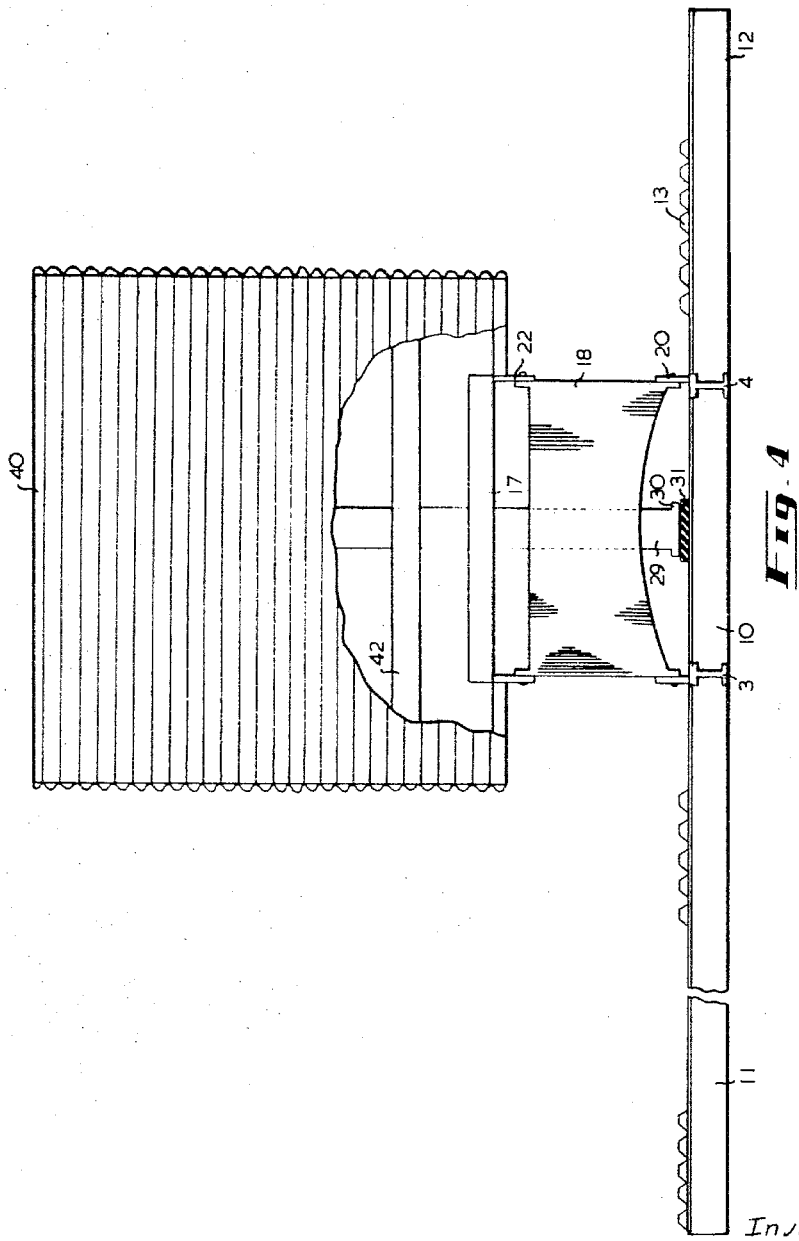
FIGURE 4 is a side elevational view corresponding with FIGURE 1.

The operation of the embodiment, shown in FIGURE 5, is similar to the operation of the load aligner shown in FIGURES 3 and 4 except that when overlength logs are encountered only one of the drums is displaced outwardly. A load aligned with the aligner, shown in FIGURE 5, would be evenly aligned on the side which contacted stationary drum 60. Any of the overlength pulpwood bolts would then protrude from the other side due to displaceable drum 80.

It is apparent from the foregoing description of the embodiments of this invention, which illustrate the simplicity of construction of the aligning apparatus, that the apparatus may be easily dismantled, packed on a truck and moved to a new location where it can be easily set up again. This means that the aligning apparatus can always be located near the place where the logs are being loaded on the transporting vehicle and the loads aligned before they enter the public highways.

I claim:

1. An apparatus for aligning a load of logs lying across a vehicle comprising a framework of a pair of longitudinal members joined at spaced intervals by transverse members, a pair of drums, each of said drums being rotatably and pivotally mounted on said framework by means of drum supporting means pivotally connected to said longitudinal members by hinge arms, said drum supporting means containing a rectangular base in which is integrally attached a column perpendicular thereto, struts extending from said column to the edge of the upper face of said rectangular base for supporting said column, one end of said column below the drum supporting means forming a pillar which rests on a transverse member for supporting and limiting the movement of said drum and the other end of said column above the drum supporting means forming an axle on which said drum is rotatably mounted, said drums being spaced to permit said vehicle with its load to be driven between said drums with said drums bearing on the ends of said logs.

2. An apparatus for aligning a load of logs according to claim 1 in which each of said drums consists of a circular shell reinforced by circular channel members and vertical channel members, said vertical channel members being joined to a drum hub means of radial spokes, said drum hub being provided with sleeve bearings and being adapted to fit on said axle so that said drum is rotatably mounted.

3. An apparatus for aligning a load of logs according to claim 2 in which ramps are attached to both sides of said longitudinal members in line with the space between said drums to provide stability for the aligning apparatus in that the load weight of the vehicle on said ramps tends to resist any over-turning moment of the aligning apparatus.

4. An apparatus for aligning a load of logs lying across a vehicle comprising a framework of a pair of longitudinal members joined at spaced intervals by transverse members; a pair of drums, one of said drums being mounted on said framework by means of first drum supporting means so that the drum cannot be displaced either horizontally or vertically but is free to rotate, said first drum supporting means being in the form of a pyramid shaped frame integrally connected to said longitudinal member with a first column integrally secured therein, said first column is also integrally secured at its bottom end to a transverse member while the top of said first column forms a first axle on which said drum is rotatably mounted, the second of said pair of drums being pivotally as well as rotatably mounted by means of second drum supporting means pivotally connected to said longitudinal members by hinge arms, said drum supporting means containing a rectangular base in which is integrally attached a second column perpendicular thereto, struts extending from said second column to the edge of the upper face of said rectangular base for supporting said second column, one end of said second column below the second drum supporting means forming a pillar with a foot thereon which rests on a rubber pad integrally attached to a transverse member for supporting and limiting the movement of said drum and the other end of said second column above the second drum supporting means forming a second axle on which said drum is rotatably mounted, said drums being spaced to permit said vehicle with its load to be driven between said drums with said drums bearing on the ends of said logs.

5. An apparatus for aligning a load of logs lying across a vehicle comprising a base framework, a pair of drums rotatably mounted on said framework, at least one of said drums being mounted on a drum support and having a first set of spaced members connected between said base framework and said drum support said spaced members being pivotally connected at each end about axes parallel to the direction of travel of the vehicle and a second set of spaced members connected between the base framework and the drum support and piovtally connected at each end about axes parallel and spaced from the first mentioned axes, the members of the first and second sets being arranged to bias said drum in the direction of the other drum of the pair of drums, said drums being spaced to permit said vehicle with its load to be driven between said drums with said drums bearing on the ends of the logs.

6. An apparatus as in claim 5 in which the base framework comprises a pair of longitudinal members joined in spaced intervals by transverse members and in which the spaced members of each set are connected by transverse members to provide frame members.

References Cited by the Examiner

UNITED STATES PATENTS

| | | | |
|---|---|---|---|
| 718,543 | 1/1903 | Starks | 214—16.42 |
| 1,843,281 | 2/1932 | Hoodless | 198—29 |
| 2,258,461 | 10/1941 | Marsden et al. | |
| 2,322,946 | 6/1943 | Lia Bastre | 248—24 |
| 3,023,916 | 3/1962 | Purse | 214—10.5 |

GERALD M. FORLENZA, *Primary Examiner.*

HUGO O. SCHULZ, *Examiner.*